US009051712B2

(12) United States Patent
Kodaka et al.

(10) Patent No.: US 9,051,712 B2
(45) Date of Patent: Jun. 9, 2015

(54) HYDRAULIC SYSTEM FOR WORKING MACHINE

(75) Inventors: Katsuaki Kodaka, Tsukuba (JP); Yuta Nakamura, Tsuchiura (JP); Hidetoshi Satake, Ishioka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 491 days.

(21) Appl. No.: 13/501,925

(22) PCT Filed: Oct. 14, 2010

(86) PCT No.: PCT/JP2010/068082
§ 371 (c)(1),
(2), (4) Date: Apr. 13, 2012

(87) PCT Pub. No.: WO2011/046184

PCT Pub. Date: Apr. 21, 2011

(65) Prior Publication Data

US 2012/0198831 A1 Aug. 9, 2012

(30) Foreign Application Priority Data

Oct. 15, 2009 (JP) ................................ 2009-238664

(51) Int. Cl.
*F16D 31/02* (2006.01)
*E02F 9/22* (2006.01)
*E02F 3/96* (2006.01)
*F15B 11/16* (2006.01)

(52) U.S. Cl.
CPC ....... *E02F 9/2228* (2013.01); *F15B 2211/3116* (2013.01); *E02F 3/962* (2013.01); *E02F 9/2282* (2013.01); *E02F 9/2285* (2013.01); (Continued)

(58) Field of Classification Search
CPC .................. F15B 11/165; F15B 11/17; F15B 2211/20576; F15B 2211/253; F15B 2211/3116; F15B 2211/45; F15B 2211/6313; F15B 2211/6316; E02F 3/962; E02F 9/2228; E02F 9/2282; E02F 9/2285; E02F 9/2292; E02F 9/2296
USPC .......... 60/420, 421, 422, 426, 445, 468, 484, 60/486
See application file for complete search history.

(56) References Cited

U.S. PATENT DOCUMENTS 5,101,628 A * 4/1992 Yoshino ......................... 60/445
5,212,950 A * 5/1993 Shirai et al. ..................... 60/422
(Continued)

FOREIGN PATENT DOCUMENTS

JP 61-184102 U 11/1986
JP 10-018359 A 1/1998
(Continued)

*Primary Examiner* — Michael Leslie
(74) *Attorney, Agent, or Firm* — Mattingly & Malur, PC

(57) ABSTRACT

A hydraulic system for a working machine is provided in which when heavy load fine speed operation work is performed using hydraulic cylinders as hydraulic actuators, and deterioration of fuel consumption can be prevented by reducing energy loss and improving fine speed operability. A center bypass cutoff valve 41 is disposed downstream of a center bypass line 26, and pressure sensors 42, 43, a controller 44, and a solenoid valve 45 provide control such that, when operating means 16 corresponding to a boom cylinder 5 (specific hydraulic actuator) among a plurality of operating means 18-21 is operated to supply a hydraulic fluid to a cylinder chamber 5*a* of the boom cylinder 5 in a load retaining side, the center bypass cutoff valve 41 is actuated and a fluid delivery pressure of a first hydraulic pump 2 is increased to be higher than a load pressure of the boom cylinder 5.

6 Claims, 10 Drawing Sheets

(52) U.S. Cl.
CPC ............. *E02F9/2292* (2013.01); *E02F 9/2296* (2013.01); *F15B 11/165* (2013.01); *F15B 2211/20576* (2013.01); *F15B 2211/253* (2013.01); *F15B 2211/45* (2013.01); *F15B 2211/6313* (2013.01); *F15B 2211/6316* (2013.01)

(56) References Cited

U.S. PATENT DOCUMENTS

| | | | | |
|---|---|---|---|---|
| 5,950,430 | A | 9/1999 | Tohji et al. | |
| 5,970,709 | A | 10/1999 | Tohji | |
| 5,996,341 | A | 12/1999 | Tohji | |
| 6,209,321 | B1 * | 4/2001 | Ikari | 60/422 |

FOREIGN PATENT DOCUMENTS

| | | | |
|---|---|---|---|
| JP | 10-102547 | A | 4/1998 |
| JP | 10-103306 | A | 4/1998 |
| JP | 2002-295409 | A | 10/2002 |
| JP | 2005-003081 | A | 1/2005 |
| JP | 2007-145471 | A | 6/2007 |

* cited by examiner

HYDRAULIC SYSTEM FOR WORKING MACHINE

TECHNICAL FIELD

The present invention relates generally to hydraulic systems for working machines such as hydraulic excavators, and more particularly, to a hydraulic system for a hydraulic excavator or any other working machine using a boom cylinder or the like to actuate a front working implement and conduct heavy load fine speed operation work such as material lifting.

BACKGROUND ART

In general, the hydraulic systems for hydraulic excavators or other working machines include, as described in Patent Document 1, a hydraulic pump, multiple kinds of hydraulic actuators driven by a hydraulic fluid delivered from the hydraulic pump, a plurality of flow/directional control valves of the center bypass type that control a flow of the hydraulic fluid supplied from the hydraulic pump to the hydraulic actuators, a plurality of operating means provided for the hydraulic actuators in order to operate the respective flow/directional control valves, and a pump regulator that controls a capacity of the hydraulic pump such that a delivery rate of the hydraulic fluid therefrom changes in response to the operation of the multiple operating means.

Some of the hydraulic systems for hydraulic excavators or other working machines also include center bypass cutoff valves arranged for various purposes in center bypass lines passing through the center bypass type flow/directional control valves. Patent Document 2 introduces one such example. The center bypass cutoff valve in this example is disposed at a most downstream end of the center bypass line so that when the flow/directional control valve is switched to a boom lowering position by control lever operations while a boom angle to a swing structure stays in a predetermined range from a maximum angle, the center bypass cutoff valve is closed and the hydraulic fluid delivered from the hydraulic pump is forcibly supplied to a rod side of the boom cylinder. This ensures that even when the hydraulic excavator is disposed on a slope, the boom can be reliably moved downward. In addition, the flow/directional control valve for the boom contains a recovery circuit, and when the boom is in a state that it can move downward under its own weight, the hydraulic fluid delivered from a bottom side of the boom cylinder, in addition to the delivered hydraulic fluid from the hydraulic pump, can be supplied to the rod side of the boom cylinder via the recovery circuit. This speeds up the starting operation of downward movement of the boom while suppressing hydraulic pump energy consumption.

PRIOR ART LITERATURE

Patent Documents

Patent Document 1: JP,A 2007-145471
Patent Document 2: JP,A 2005-3081

SUMMARY OF THE INVENTION

Problems to be Solved by the Invention

The jobs conducted by working machines such as hydraulic excavators include those which require fine speed operations under a heavy load, that is so called heavy load fine speed operation work, a typical example of which is a work of material lifting. The material lifting includes the operations of lifting a material with a wire rope hung on a hook provided at the rear of a bucket, and moving the lifted material in the air, and movement in a vertical direction (heightwise direction) of the lifted material (position adjustment) is accomplished by boom raising/lowering operations, while movement in a horizontal direction (fore and aft direction and laterally direction) of the lifted material (position adjustment) is accomplished by arm dumping/crowding and swinging operations. Boom raising/lowering is performed by driving the boom cylinder. Arm dumping/crowding is performed by driving an arm cylinder. Swinging is performed by driving a swing motor.

The boom cylinder and the arm cylinder each have a bottom-side cylinder chamber and a rod-side cylinder chamber, and during materials lifting, either the bottom-side cylinder chamber or the rod-side cylinder chamber becomes a load retaining side. For example, during material lifting, while the lifted material is being retained in the air, the load (a total weight of the front working implement and the material) acts upon the bottom-side cylinder chamber of the boom cylinder and the bottom-side cylinder chamber generates a high retaining pressure as the load-retaining side. To move the lifted material by raising the boom from this state, the fluid delivery pressure of the hydraulic pump needs to be increased above the high retaining pressure (load-retaining pressure) in the load-retaining side cylinder chamber so that the delivered fluid from the hydraulic pump is supplied to the load-retaining side cylinder chamber.

In a hydraulic system with such center bypass flow/directional control valves as described in Patent Document 1, to obtain a hydraulic pump fluid delivery pressure even higher than the high retaining pressure (load-retaining pressure) in the load-retaining side cylinder chamber, a control lever of a control lever device needs to be operated through a longer stroke for reduction of a throttle opening area in the center bypass pathway of the flow/directional control valve. The operation of the control lever through a longer stroke, however, may increase a flow rate of the hydraulic fluid delivered from the hydraulic pump, and thus a considerable portion of the delivered fluid from the hydraulic pump is likely to be returned to the fluid tank via the center bypass line without being used. If this actually happens, engine fuel consumption may be deteriorated by a significant loss of energy.

Additionally, moving the lifted material is a work that not only applies a high load thereto, but also requires fine speed operations. Control lever operation through a long stroke, however, may increase the flow rate of the hydraulic fluid delivered from the hydraulic pump, thus causing another problem of a decrease in fine speed operability.

The hydraulic system described in Patent Document 2 aims at improving operational convenience relating to the downward movement of the boom. For heavy load fine speed operation work as in a case of moving the material upward by raising the boom during lifting, the hydraulic system operates similarly to that described in Patent Document 1. This may cause substantially the same problems as those associated with the hydraulic system of Patent Document.

Lifting a material has been described above. Problems similar to those discussed above, however, are also likely to occur when a work that requires fine speed operations under a heavy load (heavy load fine speed operation work) is performed using hydraulic cylinders as hydraulic actuators.

An object of the present invention is to provide a hydraulic system for a working machine in which when the material lifting that is a heavy load fine speed operation work is performed using hydraulic cylinders as hydraulic actuators, deterioration of fuel consumption can be prevented by reducing energy loss and excellent fine speed operability can be assured.

Means for Solving the Problems (1) To attain the above object, the present invention provides the hydraulic system provided in a working machine including a front working implement having a hook for material lifting and capable of performing material lifting using the hook, the hydraulic system comprising: a hydraulic pump of a variable-capacity type; a center bypass line connected to the hydraulic pump in an upstream side thereof and connected to a tank in a downstream side thereof; a plurality of hydraulic actuators driven by a hydraulic fluid delivered from the hydraulic pump; actuator lines connected to the hydraulic actuators respectively; a plurality of flow/directional control valves of the center bypass type each including a center bypass passage and a meter-in passage, the center bypass passage being positioned in the center bypass line and the meter-in passage being positioned in a hydraulic line that communicates a hydraulic fluid supply line receiving the hydraulic fluid delivered from the hydraulic pump to the actuator lines, and the flow/directional control valves being configured such that with an increase in stroke of each valve, an opening area of the center bypass passage is reduced while an opening area of the meter-in passage is increased to thereby control flows of the hydraulic fluid supplied from the hydraulic pump to the plurality of hydraulic actuators; a plurality of operating means provided for the plurality of hydraulic actuators in order to operate the respective flow/directional control valves; and a pump regulator for controlling a capacity of the hydraulic pump such that a delivery rate of the hydraulic fluid therefrom increases depending on operations of the plurality of operating means; the hydraulic actuators including a specific hydraulic actuator that has a bottom-side cylinder chamber and a rod-side cylinder chamber and in which either one of the bottom-side cylinder chamber and the rod-side cylinder chamber becomes a load retaining side during the material lifting that is a heavy load fine speed operation work; wherein the hydraulic system comprises: a center bypass cutoff valve disposed at a position downstream of the flow/directional control valve corresponding to the specific hydraulic actuator in the center bypass line passing through the plurality of flow/directional control valves of the center bypass type; and control means for controlling the center bypass cutoff valve such that when the operating means corresponding to the specific hydraulic actuator among the plurality of operating means is operated to supply the hydraulic fluid to the cylinder chamber of the specific hydraulic actuator in the load-retaining side, the center bypass cutoff valve is actuated and a fluid delivery pressure of the hydraulic pump becomes higher than the load pressure of the specific hydraulic actuator.

With such features, when the material lifting that is the heavy load fine speed operation work is performed using the hydraulic cylinders as the hydraulic actuators, even when the operating means is small in operation stroke and the fluid delivered from the hydraulic pump is low in flow rate, the center bypass cutoff valve is activated to make the fluid delivery pressure of the hydraulic pump higher than the load pressure of the specific hydraulic actuator. The delivered fluid from the hydraulic pump is therefore supplied to the cylinder chamber of the specific hydraulic actuator in a load retaining side, thereby allowing hydraulic actuator to be driven. This prevents deterioration of fuel consumption by reducing energy loss during heavy load fine speed operation work and the excellent fine speed operability is obtained. In addition, at low load pressures of the specific hydraulic actuator, the center bypass cutoff valve remains inactive, which allows the system to be operated in substantially the same manner as the conventional technique.

(2) In above item (1), the control means preferably includes: operation detection means for detecting whether the operating means corresponding to the specific hydraulic actuator among the plurality of operating means has been operated to supply the hydraulic fluid to cylinder chamber in the load-retaining side, with an intention to conduct the material lifting that is the heavy load fine speed operation work; and bypass control means for actuating the center bypass cutoff valve when the operation detection means detects that the operating means corresponding to the specific hydraulic actuator has been operated to supply the hydraulic fluid to the cylinder chamber in the load-retaining side.

(3) In above item (1), the control means preferably includes: first detection means for detecting an operation signal of the operating means corresponding to the specific hydraulic actuator generated when the operating means is operated to supply the hydraulic fluid to the cylinder chamber in the load-retaining side; second detection means for detecting a pressure of the cylinder chamber of the specific hydraulic actuator in the load-retaining side; and bypass control means that determines, when the operation signal detected by the first detection means has a value larger than a first predetermined value and the pressure detected by the second detection means is greater than a second predetermined value, that the operating means corresponding to the specific hydraulic actuator has been operated to supply the hydraulic fluid to the cylinder chamber of the specific hydraulic actuator in the load-retaining side, and actuates the center bypass cutoff valve.

(4) In above item (3), preferably, the bypass control means calculates a target opening area of the center bypass cutoff valve, the target opening area becoming smaller as the pressure detected by the second detection means increases, and controls the center bypass cutoff valve such that the opening area of the center bypass cutoff valve equals the target opening area.

(5) In above item (1), the control means may include: first detection means for detecting an operation signal of the operating means corresponding to the specific hydraulic actuator generated when the operating means is operated to supply the hydraulic fluid to the cylinder chamber in the load-retaining side; and bypass control means that calculates a rate of change of the operation signal detected by the first detection means, and determines, when the operation signal has a value larger than a first predetermined value and the rate of change is smaller than a third predetermined value, that the operating means corresponding to the specific hydraulic actuator has been operated to supply the hydraulic fluid to the cylinder chamber of the specific hydraulic actuator in the load-retaining side, and actuates the center bypass cutoff valve.

Effects of the Invention

According to the present invention, when the material lifting that is the heavy load fine speed operation work is performed, deterioration of fuel consumption can be prevented by reducing energy loss and the excellent fine speed operability can be assured.

MODES FOR CARRYING OUT THE INVENTION

Hereunder, embodiments of the present invention will be described referring to the accompanying drawings.

First Embodiment (Overall Configuration)

Figure 1:
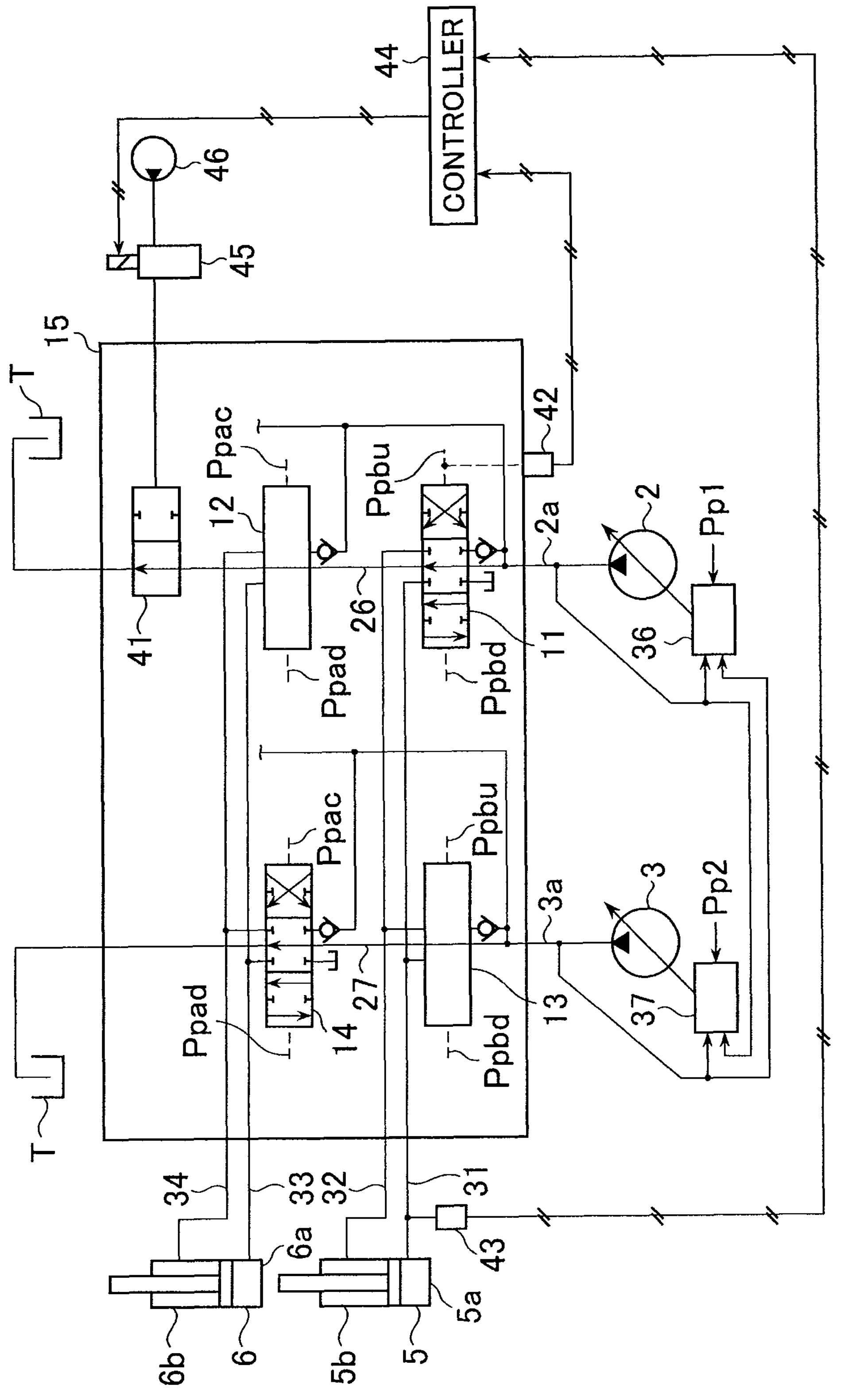
FIG. 1 is an overall configuration diagram of a hydraulic system according to a first embodiment of the present invention.
Figure 2:
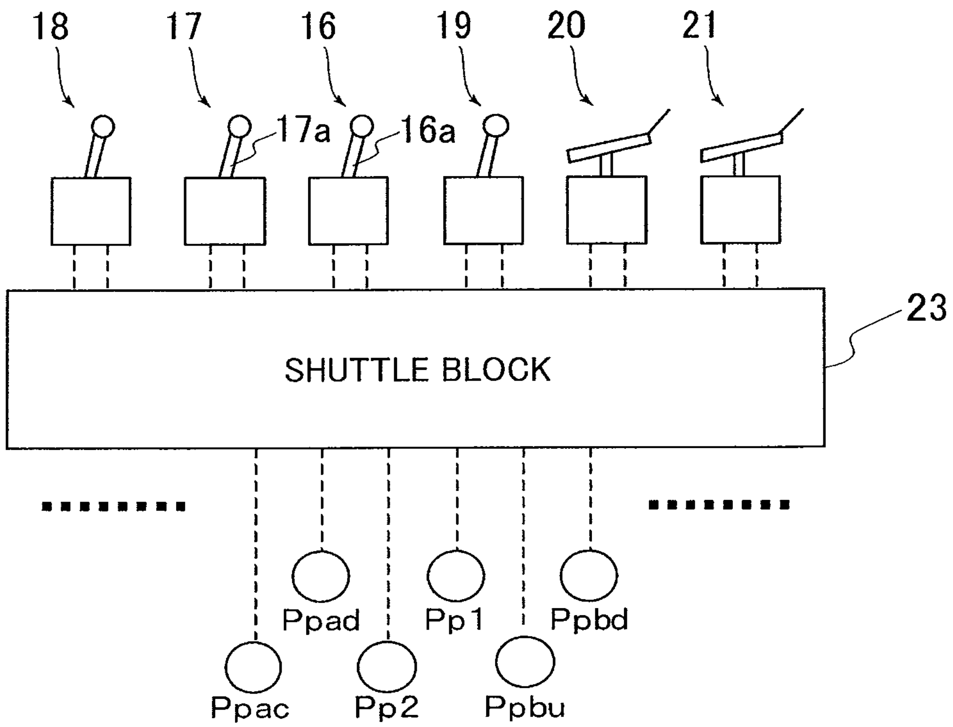
FIG. 2 is a diagram that shows operation system of the hydraulic system.

FIG. 1 is an overall configuration diagram of a hydraulic system according to a first embodiment of the present invention, and FIG. 2 is a diagram that shows operation system of the hydraulic system.

The hydraulic system according to the present embodiment includes a plurality of hydraulic pumps (main pumps) of a variable capacity type that are driven by an engine (see FIG. 7), for example, a first hydraulic pump 2 and a second hydraulic pump 3. The system also includes a plurality of hydraulic actuators including hydraulic actuators 5 and 6 driven by hydraulic fluids delivered from the first and second hydraulic pumps 2, 3. The system further includes a control valve unit 15 that contains flow/directional control valves 11 and 12 for controlling a flow rate and direction of the hydraulic fluid supplied from the first hydraulic pump 2 to the hydraulic actuators 5, 6, etc., and flow/directional control valves 13 and 14 for controlling a flow (flow rate and direction) of the hydraulic fluid supplied from the second hydraulic pump 3 to the hydraulic actuators 5, 6, and so on.

The flow/directional control valves 11-14 are of a center bypass type, the flow/directional control valves 11, 12 being arranged in a center bypass line 26 and the flow/directional control valves 13, 14 in a center bypass line 27. That is to say, the center bypass line 26 passes through the flow/directional control valves 11, 12, etc., and the center bypass line 27 passes through the flow/directional control valves 13, 14, and so on. The center bypass line 26 is connected upstream thereof to a fluid delivery line 2*a* of the first hydraulic pump 2, and is connected downstream thereof to a tank T. The center bypass line 27 is connected upstream thereof to a fluid delivery line 3*a* of the second hydraulic pump 3, and is connected downstream thereof to another tank T. In addition, the flow/directional control valves 11, 12 are both connected in parallel to the fluid delivery line 2*a* of the first hydraulic pump 2, thus working with the hydraulic actuators 5, 6, respectively, to compose a first hydraulic circuit. The flow/directional control valves 13, 14 are both connected in parallel to the fluid delivery line 3*a* of the second hydraulic pump 3, thus working with the hydraulic actuators 5, 6, respectively, to compose a second hydraulic circuit.

The hydraulic actuator 5 is a hydraulic cylinder (boom cylinder) that actuates a boom of a hydraulic excavator, and the hydraulic actuator 6 is a hydraulic cylinder (arm cylinder) that actuates an arm of the hydraulic excavator. The flow/directional control valves 11, 13 are both for the boom, and the flow/directional control valves 12, 14 are both for the arm.

The boom cylinder 5 is connected to the flow/directional control valves 11, 13 via first and second actuator lines (hydraulic lines) 31 and 32, and the arm cylinder 6 is likewise connected to the flow/directional control valves 12, 14 via actuator lines 33 and 34. The boom cylinder 5 has a bottom-side cylinder chamber (first cylinder chamber) 5*a* and a rod-side cylinder chamber (second cylinder chamber) 5*b*, the bottom-side cylinder chamber 5*a* being connected to the actuator line 31 and the rod-side cylinder chamber 5*b* being connected to the actuator line 32. Similarly, the arm cylinder 6 also has a bottom-side cylinder chamber (first cylinder chamber) 6*a* and a rod-side cylinder chamber (second cylinder chamber) 6*b*, the bottom-side cylinder chamber 6*a* being connected to the actuator line 33 and the rod-side cylinder chamber 6*b* being connected to the actuator line 34. Thus, the flows of the fluids delivered from the first and second hydraulic pumps 2, 3 are combined into one flow of fluid supplied via the flow/directional control valves 11, 13 to the boom cylinder 5, and the flows of the fluids delivered from the first and second hydraulic pumps 2, 3 are combined into one flow of fluid supplied via the flow/directional control valves 12, 14 to the boom cylinder 6.

The hydraulic system according to the present embodiment further includes, as shown in FIG. 2, a plurality of control levers 16 to 19 that include control lever devices 16 and 17 to create an operating pilot pressure for operating the flow/directional control valves 11-14. The system additionally includes operating pedal devices 20 and 21 to create an operating pilot pressure for the flow/directional control valves 11-14, and a shuttle block 23 to which are guided the operating pilot pressures that the control lever devices 16-19 and the operating pedal devices 20, 21 have created. The shuttle block 23 contains a plurality of pathways from which the operating pilot pressures created by the control lever devices 16-19 and the operating pedal devices 20, 21 are directly output. The shuttle block 23 also includes a shuttle valve group that selects the highest of the operating pilot pressures for operating the flow/directional control valves 11, 12, etc. relating to the first hydraulic pump 2, and outputs the selected operating pilot pressure as a first pump control pressure Pp1 for controlling a capacity (displacement volume) of the first hydraulic pump 2. The shuttle block 23 further includes a shuttle valve group that selects the highest of the operating pilot pressures for operating the flow/directional control valves 13, 14, etc. relating to the second hydraulic pump 3, and outputs the selected operating pilot pressure as a second pump control pressure Pp2 for controlling a capacity (displacement volume) of the second hydraulic pump 3.

The control lever device 16 is for the boom, and has a pressure reducer, which is a valve that creates, on the basis of a fluid delivery pressure of a pilot pump 46 driven by the engine 1 (see FIG. 7), a boom-up operating pilot pressure Ppbu or a boom-down operating pilot pressure Ppbd, depending upon an operating direction of the control lever 16*a*. In this case, the operating pilot pressure Ppbu is defined by a boom-raising (up) command, and the operating pilot pressure Ppbd by a boom-lowering (down) command. The created operating pilot pressure Ppbu or Ppbd is guided to appropriate pressure receivers of the flow/directional control valves 11, 13. The flow/directional control valves 11, 13 are then switched to a position corresponding to a boom-raising direction (in the figure, leftward) or boom-lowering direction (in the figure, rightward), depending upon the operating pilot pressure Ppbu or Ppbd. The control lever device 17 is for the arm, and has a pressure reducer, which is a valve that on the basis of the fluid delivery pressure of the pilot pump 46, creates an arm-crowding pilot pressure Ppac or an arm-dumping pilot pressure Ppad, depending upon an operating direction of the control lever 17*a*. In this case, the operating pilot pressure Ppac is defined by an arm-crowding (pull) command, and the operating pilot pressure Ppad by an arm-dumping (push) command. The created operating pilot pressure Ppac or Ppad is guided to appropriate pressure receivers of the flow/directional control valves 12, 14. The flow/directional control valves 12, 14 are then switched to a position corresponding to an arm-crowding direction (in the figure, leftward) or arm-dumping direction (in the figure, rightward), depending upon the operating pilot pressure Ppac or Ppad.

The control lever devices 16-19 and the operating pedal devices 20, 21 are hereinafter referred to collectively as operating devices (operating means).

Figure 3A:
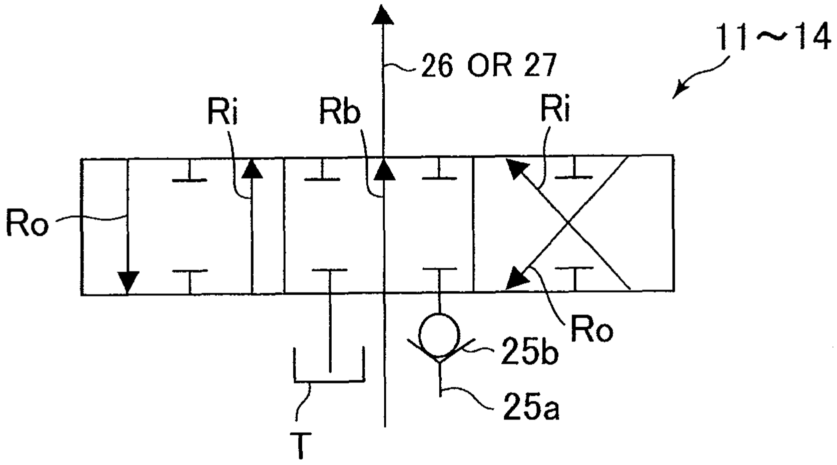
FIG. 3A is a diagram that shows graphic symbols for flow/directional control valves of the center bypass type in enlarged form.
Figure 3B:
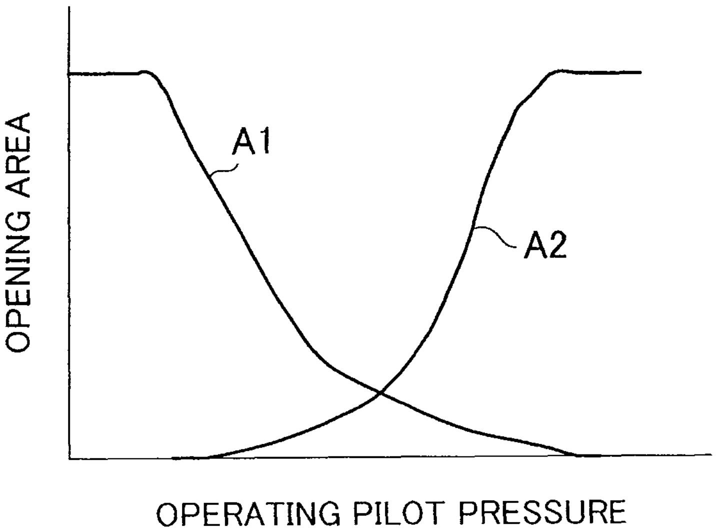
FIG. 3B is a diagram that shows opening area characteristics of the flow/directional control valves of the center bypass type.

FIG. 3A is a diagram that shows graphic symbols for the center bypass flow/directional control valves 11-14 in enlarged form, and FIG. 3B is a diagram that shows opening area characteristics of the center bypass flow/directional control valves 11-14.

The center bypass flow/directional control valves 11-14 each have a center bypass passage Rb, a meter-in passage Ri, and a meter-out passage Ro, each of the passages has such predetermined opening area characteristics (described later herein) as in FIGS. 3A and 3B, the opening area characteristics depending upon switching strokes of the flow/directional control valves 11-14. The center bypass passage Rb is positioned on the center bypass line 26 or 27, and the meter-in passage Ri is positioned on a hydraulic line that makes a hydraulic fluid supply line 25*a* communicate with the actuator line 31 or 32; 33 or 34, the hydraulic fluid supply line 25*a* connecting to the fluid delivery line 2*a* or 3*a* of the first hydraulic pump 2 or 3. The meter-out passage Ro is positioned on a hydraulic line that makes the actuator line 31 or 32; 33 or 34 communicate with the tank T. A load check valve 25*b* for preventing the hydraulic fluid from flowing backward from the hydraulic actuator side is provided on the hydraulic fluid supply line 25*a*.

The center bypass passage Rb has the opening area characteristics shown as reference number A1 in FIG. 3B, and the meter-in passage Ri has the opening area characteristics shown as reference number A2 in FIG. 3B. A horizontal axis in FIG. 3B denotes the operating pilot pressure that an appropriate operating device creates, and the operating pilot pressure varies substantially with an operating quantity of the control lever or operating pedal or with a stroke of the flow/directional control valve. A vertical axis in FIG. 3B denotes opening areas of the center bypass passages Rb and meter-in passage Ri.

As the control lever or operating pedal of the operating device is operated and the operating pilot pressure rises (i.e., as the operating quantity or the stroke of the flow/directional control valve increases), the opening area of the center bypass passage Rb decreases and that of the meter-in passage Ri increases. When the control lever reaches a full stroke and the operating pilot pressure becomes a maximum, the opening area of the center bypass passage Rb becomes zero (fully closed) and that of the meter-in passage Ri becomes a maximum. In other words, an inverse relationship exists between a change in the opening area of the center bypass passage Rb with respect to the operating pilot pressure, and a change in the opening area of the meter-in passage Ri with respect to the operating pilot pressure.

Although not shown, the opening area characteristics of the meter-out passage Ro are substantially the same as those of the meter-in passage Ri.

Referring back to FIG. 1, the first hydraulic pump 2 includes a first regulator 36 and the second hydraulic pump 3 includes a second regulator 37. The first regulator 36 receives input signals corresponding to the above-mentioned first pump control pressure Pp1 and to a fluid delivery pressure of the first hydraulic pump 2 relating to the regulator, and conducts positive control and input torque limit control. Likewise, the second regulator 37 receives input signals corresponding to the above-mentioned second pump control pressure Pp2 and to a fluid delivery pressure of the second hydraulic pump 3 relating to the regulator, and conducts positive control and input torque limit control.

Figure 4:
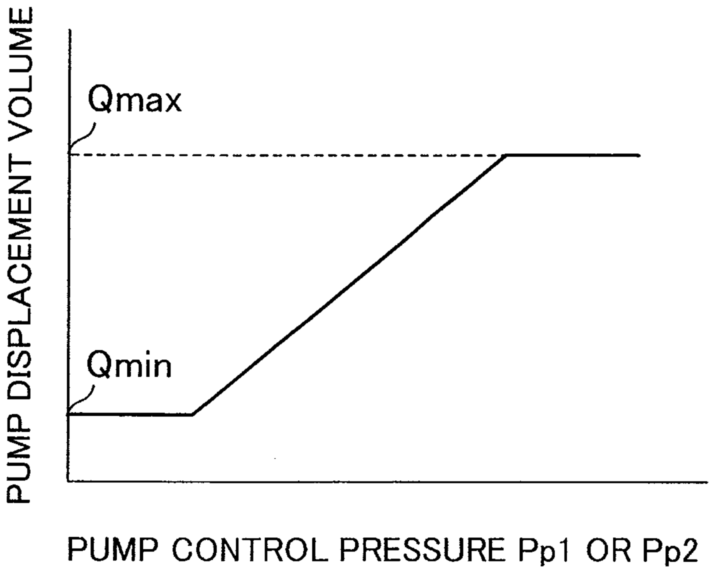
FIG. 4 is a diagram representing a relationship between a pump control pressure and pump displacement volume during positive control.

FIG. 4 is a diagram representing a relationship between the pump control pressure and pump displacement volume during positive control. The first regulator 36 controls the first hydraulic pump 2 for the displacement volume thereof to increase with increases in the first pump control pressure Pp1. The second regulator 37 also functions the same for the second hydraulic pump 3. Referring to FIG. 4, "qmin" denotes a minimum displacement volume of the first and second hydraulic pumps 2, 3 and "qmax" denotes a maximum displacement volume of the first and second hydraulic pumps 2, 3.

Figure 5:
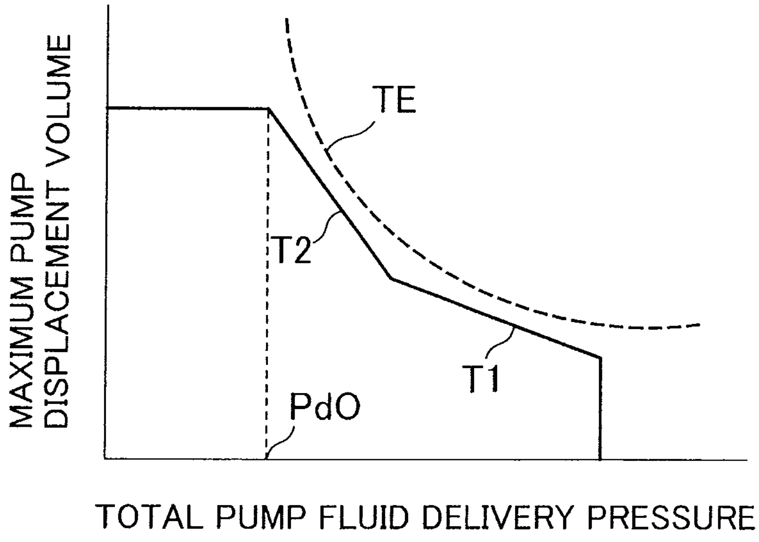
FIG. 5 is a diagram representing a relationship between a pump delivery pressure and maximum pump displacement volume during input torque limit control.

FIG. 5 is a diagram representing a relationship between the pump delivery pressure and maximum pump displacement volume during input torque limit control. If the fluid delivery pressures of the first and second hydraulic pumps 2, 3 increase and a total (sum) of these pressures is greater than a predetermined value Pd0, the first regulator 36 reduces the maximum displacement volume of the first hydraulic pump 2 along maximum absorption torque characteristic curves T1 and T2 with increases in pump fluid delivery pressure and controls the displacement volume of the first hydraulic pump 2 so that an absorption torque of the pump 2 is held at a substantially constant value. The second regulator 37 also functions the same for the second hydraulic pump 3. Referring to FIG. 5, reference symbol TE denotes, of all output torques of the engine driving the first and second hydraulic pumps 2, 3, only a pump base torque allocated to the first and second hydraulic pumps 2, 3. A maximum absorption torque represented by the maximum absorption torque characteristic curves T1, T2 is preset to be somewhat smaller than the pump base torque TE.

Thus, when the hydraulic actuator relating to the first hydraulic pump 2 is driven, the first regulator 36 increases the displacement volume of the first hydraulic pump 2 according to a particular operating quantity (flow rate demand) of the relevant operating device (control lever device and operating pedal device) and hence increases the flow rate of the hydraulic fluid delivered from the pump. In addition, if the total fluid delivery pressure of the first and second hydraulic pumps 2, 3 increases above the predetermined value Pd0, the first regulator 36 reduces the displacement volume of the first hydraulic pump 2 along the torque limit control characteristic curves T1, T2, thereby providing control for a total absorption torque of the pumps 2, 3 not to exceed the maximum absorption torque presetting based upon the torque limit control characteristic curves T1, T2.

(Control Circuits)

Referring back to FIG. 1, the hydraulic system of the present embodiment further includes the following as feature constituent elements. These elements are a center bypass cutoff valve 41 disposed the most downstream end of the center bypass line 26 relating to the first hydraulic pump 2, a pressure sensor 42 that detects the operating pilot pressure Ppbu for raising the boom, a pressure sensor 43 that detects a pressure (boom bottom pressure) of the bottom-side cylinder chamber 5*a* of the boom cylinder 5, a controller 44, and a solenoid valve 45 actuated by a control signal from the controller 44 to generate a control pressure based upon the fluid delivery pressure of the pilot pump 46 driven by the engine 1 (see FIG. 7). The control pressure from the solenoid valve 45 is applied to the center bypass cutoff valve 41, switching the valve 41 from an open position to a close position.

(Controller)

Figure 6:
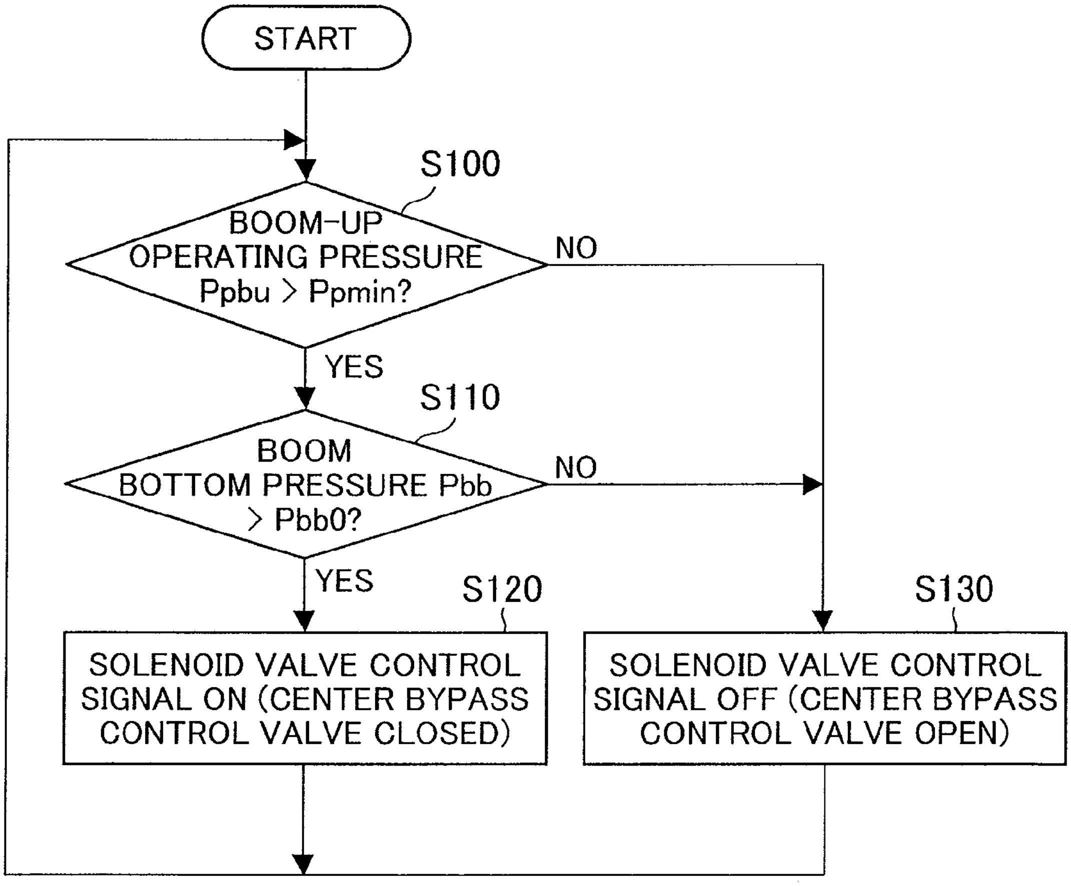
FIG. 6 is a flowchart that shows details of processing by a controller equipped in the hydraulic system according to the first embodiment of the present invention.

FIG. 6 is a flowchart that shows details of processing by the controller 44.

The controller 44 receives a detection signal from the pressure sensor 42 and determines whether the operating pilot pressure Ppbu for raising the boom is greater than a predetermined value Ppmin (step S100). The predetermined value Ppmin is a minimal operating pilot pressure created when the control lever or operating pedal of the operating device (control lever device and operating pedal device). The fact that the operating pilot pressure Ppbu for raising the boom is greater than the minimal operating pilot pressure Ppmin means that the control lever 16*a* of the control lever device 16 for the boom has been operated in the boom-raising direction.

Here, if the fluid delivery pressure of the pilot pump 46 that is a main (primary) pressure of the pressure reducer which the boom control lever device 16 has is 4 MPa, the predetermined value Ppmin is nearly 0.5 MPa, for example.

When the operating pilot pressure Ppbu for raising the boom is greater than the predetermined value Ppmin, the controller 44 further receives a detection signal from the pressure sensor 43 and determines whether the pressure (boom bottom pressure) Pbb of the bottom-side cylinder chamber 5*a* of the boom cylinder 5 is greater than a predetermined value Pbb0 (step S110). The predetermined value Pbb0 is a minimal boom bottom pressure (load-retaining pressure) suitably applied to the present invention during lifting. The fact that the boom bottom pressure Pbb is greater than the predetermined value Pbb0 means that the present invention is suitably applied to lifting.

Here, if a maximum circuit pressure set for the hydraulic system via a main relief valve not shown is 35 MPa, the predetermined value Pbb0 is nearly 25 MPa, for example.

Additionally, when the boom bottom pressure Pbb is greater than the predetermined value Pbb0, the controller 44 determines lifting to have been started. In this case, the controller 44 generates a control ON signal to energize the solenoid valve 45, and after providing this control ON signal with software-based filtering, outputs the filtered signal to the solenoid valve 45 (step S120). This makes the solenoid valve 45 generate a control pressure equivalent to the control ON signal, and thus switch the center bypass cutoff valve 41 from the open position to the close position.

Conversely if the boom-up operating pilot pressure Pbbu is not greater than the predetermined value Ppmin or if the boom bottom pressure Pbb is not greater than the predetermined value Pbb0, the controller 44 leaves the control signal off for the solenoid valve 45 (step S130) and holds the center bypass cutoff valve 41 in its open position.

(Hydraulic Excavator and Lifting)

Figure 7:
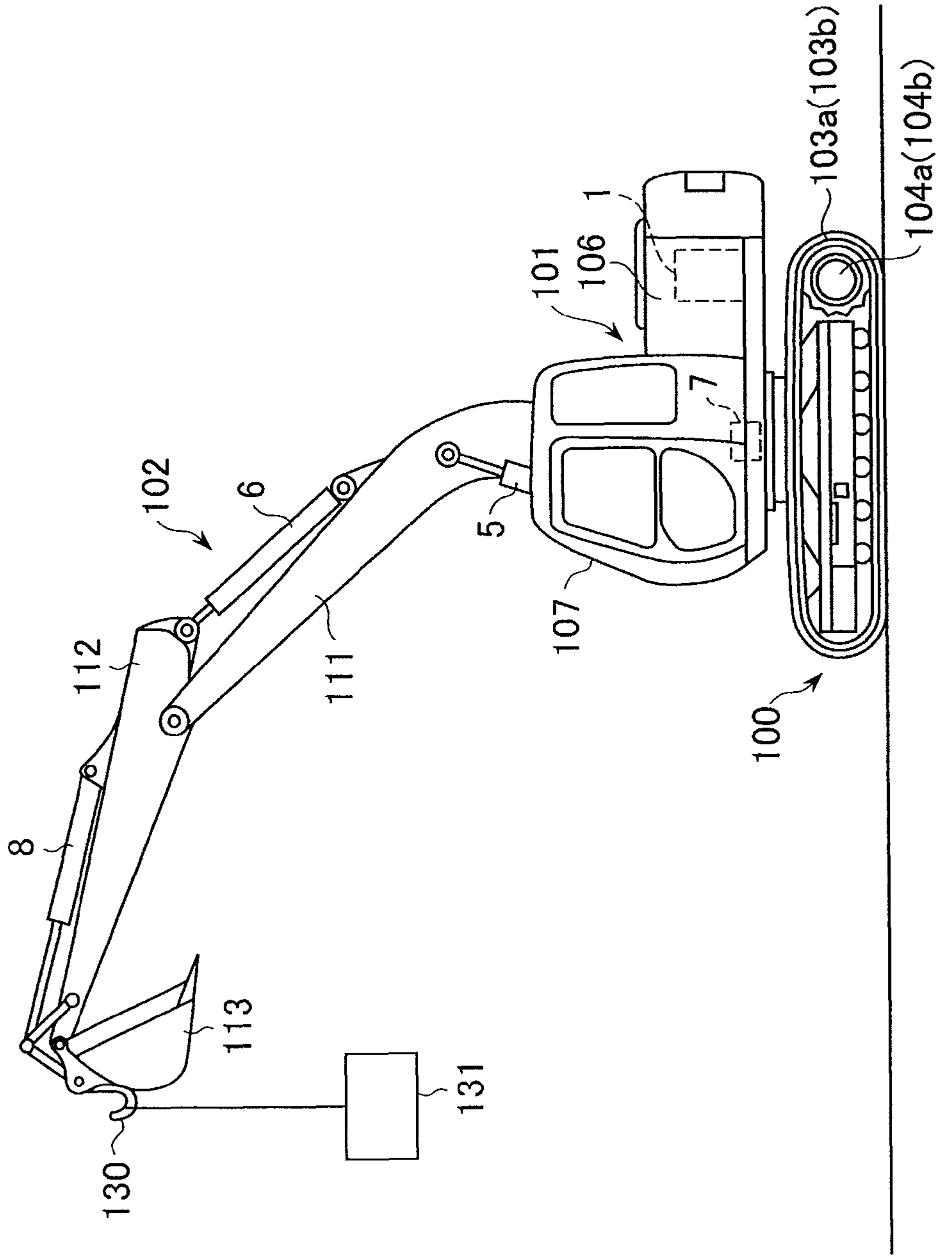
FIG. 7 is an external view of a hydraulic excavator (working machine) in which the hydraulic system of the present invention is mounted.

FIG. 7 is an external view of the hydraulic excavator (working machine) in which the hydraulic system of the present invention is mounted.

The hydraulic excavator includes a lower track structure 100, an upper swing structure 101, and a front working implement 102. The lower track structure 100 has left and right crawler track devices 103*a* and 103*b*, and is driven by left and right traveling motors, 104*a* and 104*b*. The upper swing structure 101 is pivotally mounted above the lower track structure 100, and is pivotally driven by a swing motor 7. The front working implement 102 is tiltably installed on an upper front section of the upper swing structure 101. The upper swing structure 101 includes an engine room 106 and a cabin 107 (operator's compartment), with an engine 1, first and second hydraulic pumps 2, 3, a pilot pump 46, and other hydraulic devices being arranged in the engine room 106, and with control levers 16-19, operating pedals 20, 21, and other operating devices being arranged in the cabin 107.

The front working implement 102 is an articulated structure with a boom 111, an arm 112, and a bucket 113, the boom 111 being pivotally moved upward and downward by extraction/contraction of a boom cylinder 5, the arm 112 being pivotally moved upward/downward and forward/backward by extraction/contraction of an arm cylinder 6, and the bucket 113 being pivotally moved upward/downward and forward/backward by extraction/contraction of a bucket cylinder 8.

The left and right traveling motors 104*a*, 104*b*, the swing motor 7, the bucket cylinder 8, and other elements relating to hydraulic actuators are omitted in the hydraulic circuit diagram of FIG. 1 that shows the hydraulic system.

A retractable hook 130 is provided on the back of the bucket 113. The hook 130 provided for lifting purposes is used, as shown in FIG. 7, to lift a material 131 using a wire rope hung from the hook 130 on the back of the bucket 113. During the lifting of the material, movement in a vertical direction (heightwise direction) of the lifted material 131 (position adjustment) is accomplished by raising/lowering operations of the boom 111, while movement in a fore and aft direction and a lateral direction (horizontal direction) of the lifted material 131 (position adjustment) is accomplished by pushing/pulling (arm dumping/arm crowding) and swinging of the arm 112. During boom raising, the bottom-side cylinder chamber 5*a* of the boom cylinder 5 becomes a load retaining side, and a high retaining pressure is generated in the bottom-side cylinder chamber 5*a*. Such lifting is heavy load fine speed operation work that requires operating the machine with fine speeds under a heavy load.

(Relationship with the Appended Claims)

In the above, the boom cylinder 5 constitutes a specific hydraulic actuator that has a bottom-side cylinder chamber 5*a* and a rod-side cylinder chamber 5*b* and in which the bottom-side cylinder chamber 5*a* being either one of the bottom-side cylinder chamber and the rod-side cylinder chamber becomes a load retaining side during heavy load fine speed operation work. In addition, the pressure sensors 42, 43, the controller 44, and the solenoid valve 45 constitute control means for controlling the center bypass cutoff valve 41 such that when the operating means 16 corresponding to the specific hydraulic actuator 5 among the plurality of operating means 16-21 is operated to supply the hydraulic fluid to the cylinder chamber 5*a* of the specific hydraulic actuator 5 in the load-retaining side, the center bypass cutoff valve 41 is actuated and a fluid delivery pressure of the first hydraulic pump 2 becomes higher than the load pressure of the specific hydraulic actuator 5.

Furthermore, the pressure sensors 42, 43 and the functions that the controller 44 performs in steps S100, S110 of FIG. 6 constitute operation detection means for detecting whether the operating means 16 corresponding to the specific hydraulic actuator 5 among the plurality of operating means 16-21 has been operated to supply the hydraulic fluid to cylinder chamber 5*a* in the load-retaining side, with an intention to conduct the heavy load fine speed operation work. Additionally, the function that the controller 44 performs in step S120 of FIG. 6, and the solenoid valve 45 constitute bypass control means for actuating the center bypass cutoff valve 41 when the operation detection means detects that the operating means 16 corresponding to the specific hydraulic actuator 5 has been operated to supply the hydraulic fluid to the cylinder chamber 5*a* in the load-retaining side.

Moreover, the pressure sensor 42 constitutes first detection means for detecting an operation signal of the operating means 16 corresponding to the specific hydraulic actuator 5 generated when the operating means 16 is operated to supply the hydraulic fluid to the cylinder chamber 5*a* in the load-retaining side. The pressure sensor 43 constitutes second detection means for detecting a pressure of the cylinder chamber 5*a* of the specific hydraulic actuator 5 in the load-retaining side. The controller 44 and the solenoid valve 45 constitute bypass control means that determines, when the operation signal detected by the first detection means has a value larger than a first predetermined value Ppmin and the pressure detected by the second detection means is greater than a second predetermined value Pbb0, that the operating means 16 corresponding to the specific hydraulic actuator 5 has been operated to supply the hydraulic fluid to the cylinder chamber of the specific hydraulic actuator 5*a* in the load-retaining side, and actuates the center bypass cutoff valve 41.

(Operation)

The following considers a case in which, as shown in FIG. 7, the material 131 retained in the air is moved upward by boom-raising operations during lifting.

An operator operates the control lever 16*a* of the boom control lever device 16 in the boom-raising direction with an intention to move the material 131 upward by raising the boom during lifting. The operating pilot pressure Ppbu, defined by the boom-raising command, is then guided to the pressure receivers of the flow/directional control valves 11, 13, and the flow/directional control valves 11, 13 are switched to the position corresponding to the arm-raising direction (in the figure, leftward). The shuttle block 23 outputs the operating pilot pressure Ppbu as the first pump control pressure Pp1 and the second pump control pressure Pp2. After this, the first pump control pressure Pp1 and the second pump control pressure Pp2 are guided to the first and second regulators 36, 37 of the first and second hydraulic pumps 2, 3. The first and second hydraulic pumps 2, 3 then increase in displacement volume according to particular magnitudes of the first and second pump control pressures Pp1, Pp2 (i.e., magnitude of the operating pilot pressure Ppbu defined by the boom-raising command), thereby increasing in fluid delivery flow rate.

The operating pilot pressure Ppbu defined by the boom-raising command, on the other hand, is detected by the pressure sensor 42, and the detection signal from the pressure sensor 42 is input to the controller 44 along with the detection signal applied from the pressure sensor 43 detecting the pressure (boom bottom pressure) of the bottom-side cylinder chamber 5*a* inside the boom cylinder 5. The controller 44 uses the detection signals to conduct processing shown in the flowchart of FIG. 6. During this processing, the control lever 16*a* for the boom is being operated and the operating pilot pressure Ppbu is greater than Ppmin. While the material 131 remains retained in the air, the boom bottom pressure Pbb is also greater than Pbb0. As a result, the determinations conducted in steps S100 and S110 are both affirmed and after output of the control ON signal to the solenoid valve 45 in step S120, the center bypass cutoff valve 41 is switched from the open position to the close position to cut off the center bypass line 26.

Hence, even if the operating quantity of the control lever 16*a* is small and the fluid delivery flow rates of the first and second hydraulic pumps 2, 3 are also small, the fluid delivery pressure of the first hydraulic pump 2 rapidly increases above the boom bottom pressure Pbb and causes the delivered fluid from the first hydraulic pump 2 to be supplied to the bottom-side cylinder chamber 5*a* of the boom cylinder 5, that is, to the cylinder chamber in a load retaining side. The boom cylinder 5 is consequently driven to extend for an upward turn of the boom.

Under normal working conditions with low boom pressure Pbb, the determination in step S110 is negated, so that the center bypass cutoff valve 41 remains inactive and the boom cylinder 5 operates as usual.

(Effects)

In the flow/directional control valves 11, 13 of the center bypass type, as shown in FIG. 3, the center bypass passage Rb and the meter-in passage Ri have inverse opening area characteristics with respect to the operating pilot pressure (the control lever operation stroke of the control lever device). As the operating pilot pressure (the control lever operation stroke of the control lever device) increases, therefore, the opening area of the center bypass passage Rb decreases and that of a variable throttle on the meter-in passage Ri increases. The fluid delivery pressures of the hydraulic pumps 2, 3, on the other hand, lie in inverse proportion with respect to the opening area of the center bypass passage Rb, that is, as the opening area of the center bypass passage Rb decreases, the fluid delivery pressures of the hydraulic pumps 2, 3 increase.

Moving the material 131 upward by raising the boom during lifting requires supplying the delivered fluids from the hydraulic pumps 2, 3 to the cylinder chamber (bottom cylinder chamber 5*a*) of the boom cylinder 5 in the load retaining side. To this end, the fluid delivery pressures of the hydraulic pumps 2, 3 need to be elevated above the load-retaining pressure of the boom cylinder 5 by significantly reducing the opening area of the center bypass passage Rb. To significantly reduce the opening area of the center bypass passage Rb in a conventional hydraulic system, there has been the need to operate the control lever 16*a* of the control lever device 16 through a long stroke, that is, the operating quantity of the lever has needed to be large.

As shown in FIG. 4, however, the displacement volumes of the hydraulic pumps 2, 3 controlled by the regulators 36, 37 increase with increases in the lever operating quantity of the control lever device 16 and in the first and second pump control pressures Pp1, Pp2 generated from the operating pilot pressures. The increase in the operating quantity of the control lever 16*a* of the control lever device 16, therefore, increases the fluid delivery pressures of the first and second hydraulic pumps 2, 3, causing a considerable part of the delivered fluids from the first and second hydraulic pumps 2, 3 to flow back into the tanks via the center bypass lines 26, 27. As a result, the fuel consumption of engine 1 may be deteriorated by a significant loss of energy. Additionally, since moving the lifted material not only applies a high load thereto, but also requires operating the machine with fine speed operations (heavy load fine speed operation work), the increases in the fluid delivery pressures of the first and second hydraulic pumps 2, 3 due to the long-stroke operation of the control lever 16*a* of the control lever device 16 are likely to cause another problem of a decrease in fine speed operability.

In contrast to such conventional techniques as discussed above, in the present embodiment, even if the operating quantity of the control lever 16*a* for the boom during lifting is small, since the center bypass cutoff valve 41 operates to cut off the center bypass line 26, the operation of the control lever 16*a* immediately elevates the fluid delivery pressure of the first hydraulic pump 2 above the boom bottom pressure Pbb. The delivered fluid from the first hydraulic pump 2 is therefore supplied to the bottom cylinder chamber 5*a* (load-retaining side cylinder chamber) of the boom cylinder 5, thus driving the boom cylinder 5 in its extending direction, and allowing the boom to be raised. This reduces energy loss and prevents the deterioration of fuel consumption. Further, the small amount of operation of the control lever 16*a* lessens the fluid delivery flow rates of the first and second hydraulic pumps 2, 3, thereby assuring the excellent fine speed operability.

The description heretofore given above relates to lifting a material. During other heavy load fine speed operation work with boom raising, however, the hydraulic system operates likewise and yields substantially the same advantageous effects.

As described heretofore, in accordance with the present embodiment, when heavy load fine speed operation work is conducted as in the case of moving the material upward during lifting, the center bypass cutoff valve 41 is activated just by slightly operating the control lever 16*a* of the control lever device 16, and the center bypass line 26 is cut off as a result. This immediately increases the fluid delivery pressures of the first and second hydraulic pumps 2, 3, easily and readily drives the boom cylinder 5 even under a heavy load pressure, thereby reducing energy loss to prevent deterioration of fuel consumption and obtaining the excellent fine speed operability.

In addition, under normal working conditions with the low boom pressure Pbb, the boom cylinder 5 operates as usual, since the center bypass cutoff valve 41 remains inactive.

Second Embodiment

Figure 8:
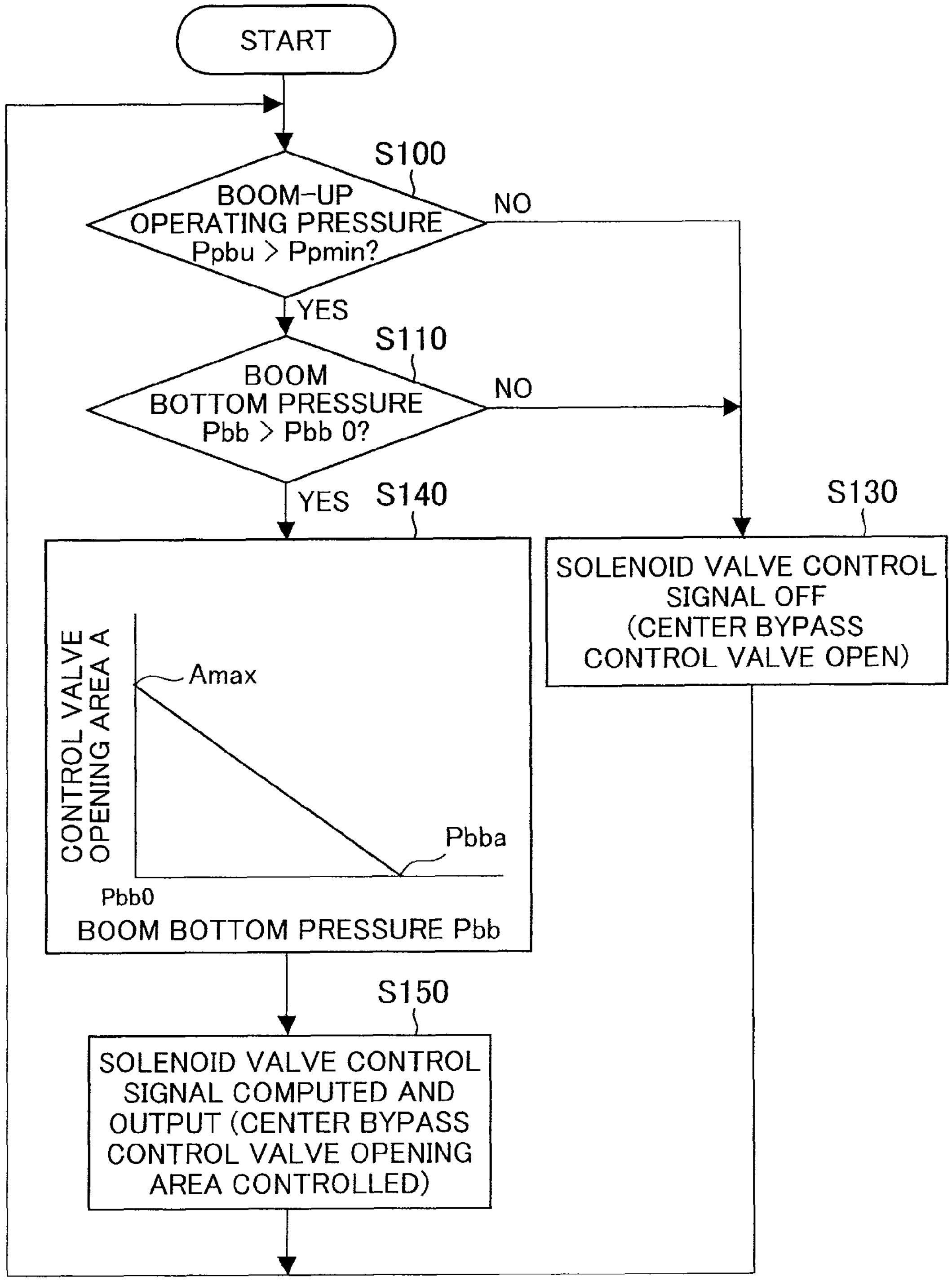
FIG. 8 is a flowchart that shows details of processing by a controller equipped in a hydraulic system according to a second embodiment of the present invention.

A second embodiment of the present invention is described below referring to FIG. 8. FIG. 8 is a flowchart that shows details of processing by a controller equipped in a hydraulic system according to the present embodiment. An overall configuration of the hydraulic system in the present embodiment is the same as that shown in FIGS. 1, 2, and description of the system configuration is omitted below.

Referring to FIG. 8, the controller 44 (see FIG. 1) conducts substantially the same kind of processing as in steps S100, S110, S130 of the first embodiment. That is, the controller 44 receives the detection signal from the pressure sensor 42 and determines whether the boom-up operating pilot pressure Ppbu is greater than a predetermined value Ppmin (step S100). Next, if the boom-up operating pilot pressure Ppbu is greater than the predetermined value Ppmin, the controller further receives the detection signal from the pressure sensor 43 and determines whether the pressure (boom bottom pressure) of the bottom-side cylinder chamber 5*a* of the boom cylinder 5 is greater than the predetermined value Pbb0 (step S110). If the boom-up operating pilot pressure Ppbu is not greater than the predetermined value Ppmin or if the boom bottom pressure is not greater than a predetermined value Pbb0, the controller leaves the control signal off for the solenoid valve 45 (step S130) and holds the center bypass cutoff valve 41 in its open position. Here, as described above, if the fluid delivery pressure of the pilot pump 46 that is the main (primary) pressure of the pressure reducer which the boom control lever device 16 has is 4 MPa, the predetermined value Ppmin is nearly 0.5 MPa, for example.

Conversely if the boom-up operating pilot pressure Pbbu is greater than the predetermined value Ppmin and the boom bottom pressure is greater than the predetermined value Pbb0, the controller 44 refers to a table in which the boom bottom pressure detected by the pressure sensor 43 has been memory-stored, and calculates the opening area A of the center bypass cutoff valve 41 that corresponds to that boom bottom pressure (step S140). A relationship between the boom bottom pressure Ppbu and the opening area A is previously set in the table of the memory. That is to say, as shown in FIG. 8, when the boom bottom pressure Ppbu is equal to the predetermined value Pbb0, the opening area A takes a maximum value Amax (fully open), as the boom bottom pressure increases above Pbb0, the opening area A decreases, and when the boom bottom pressure reaches a predetermined value Pbba, the opening area A decreases to zero (0).

Here, if the maximum circuit pressure set for the hydraulic system via the main relief valve not shown is 35 MPa, the predetermined value Pbba is nearly 30 MPa, for example.

Next, the controller 44 computes the solenoid valve control signal so that the opening area of the center bypass cutoff valve 41 that was calculated in step S140 is defined as the opening area A. After the computation, the controller provides the control signal with software-based filtering and then outputs the filtered control signal to the solenoid valve 45 (step S150).

In the above, the function of the controller 44 that is shown in FIG. 8, and the solenoid valve 45 shown in FIG. 1 constitute bypass control means that determines, when the operation signal detected by the first detection means (pressure sensor 42) has a value larger than a first predetermined value Ppmin and the pressure detected by the second detection means (pressure sensor 43) is greater than a second predetermined value Pbb0, that the operating means 16 corresponding to the specific hydraulic actuator 5 has been operated to supply the hydraulic fluid to the cylinder chamber of the specific hydraulic actuator 5 in the load-retaining side, and actuates the center bypass cutoff valve 41.

Additionally in the present embodiment, the bypass control means calculates a target opening area A of the center bypass cutoff valve 41, the target opening area becoming smaller as the pressure detected by the second detection means (pressure sensor 43) increases, and controls the center bypass cutoff valve such that the opening area of the center bypass cutoff valve 41 equals the target opening area.

The present embodiment having the above configuration/construction also yields substantially the same effects as in the first embodiment.

Furthermore in the present embodiment, since the opening area A of the center bypass cutoff valve 41 that varies inversely as the particular boom bottom pressure is calculated and the operation of the center bypass cutoff valve 41 is controlled to obtain that opening area, the opening area of the center bypass cutoff valve 41 is reduced, if necessary, according to a magnitude of the load of the material lifted. The reduction results in the fluid delivery pressure of the first hydraulic pump 2 increasing more smoothly, the boom cylinder 5 being driven more smoothly, and the seamless material lifting is realized.

Third Embodiment

Figure 9:
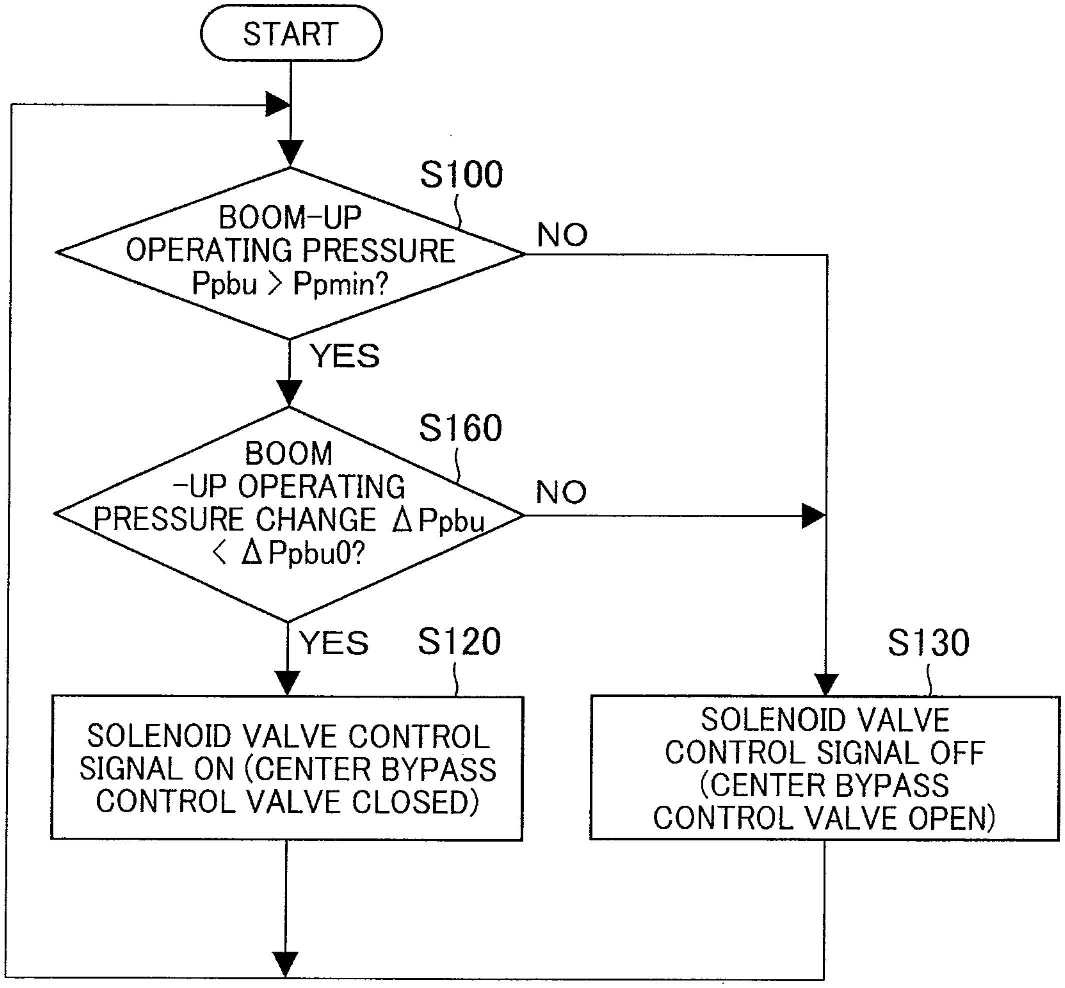
FIG. 9 is a flowchart that shows details of processing by a controller equipped in a hydraulic system according to a third embodiment of the present invention.

A third embodiment of the present invention is described below referring to FIG. 9. FIG. 9 is a flowchart that shows details of processing by a controller equipped in a hydraulic system according to the present embodiment. An overall configuration of the hydraulic system in the present embodiment is substantially the same as that shown in FIGS. 1, 2, except in that the system does not include the pressure sensor 43 for boom bottom pressure detection, shown in FIG. 1 of the first embodiment. Description of the system configuration is therefore omitted below.

Referring to FIG. 9, the controller 44 (see FIG. 1) conducts substantially the same kind of processing as in steps S100, S130 of the first embodiment. That is to say, the controller 44 receives the detection signal from the pressure sensor 42 and determines whether the boom-up operating pilot pressure Ppbu is greater than a predetermined value Ppmin (step S100). Next, if the boom-up operating pilot pressure Ppbu is not greater than the predetermined value Ppmin, the controller leaves the control signal off for the solenoid valve 45 (step S130) and holds the center bypass cutoff valve 41 in its open position.

Conversely if the boom-up operating pilot pressure Ppbu is greater than the predetermined value Ppmin, the controller 44 calculates a change rate ΔPpbu of the boom-up operating pilot pressure Ppbu and determines whether the change rate ΔPpbu is greater than a predetermined value ΔPpbu0 (step S160). The change rate ΔPpbu of the boom-up operating pilot pressure Ppbu varies according to a particular operating speed of the control lever 16*a* of the boom control lever device 16, and the predetermined value ΔPpbu0 has association with a maximum operating speed that the control lever 16*a* is assumed to obtain during lifting. If the change rate ΔPpbu of the boom-up operating pilot pressure Ppbu is smaller than the predetermined value ΔPpbu0, this means that the control lever 16*a* of the boom control lever device 16 is most likely to have been operated in a boom-raising direction and that lifting is most likely to being currently underway.

If the change rate ΔPpbu of the boom-up operating pilot pressure Ppbu is smaller than the predetermined value ΔPpbu0, the controller also determines lifting to have been started, generates the control ON signal to energize the solenoid valve 45, and after providing this control ON signal with software-based filtering, outputs the filtered signal to the solenoid valve 45 (step S120). This makes the solenoid valve 45 generate a control pressure equivalent to the control ON signal, and thus switch the center bypass cutoff valve 41 from the open position to the close position.

Conversely if the change rate ΔPpbu of the boom-up operating pilot pressure Ppbu is not smaller than the predetermined value ΔPpbu0, the controller 44 leaves the control signal off for the solenoid valve 45 (step S130) and holds the center bypass cutoff valve 41 in its open position.

In the above, the pressure sensor 42 shown in FIG. 1, and the functions that the controller 44 performs in steps S100, S160 of FIG. 9 constitute operation detection means for detecting whether the operating means 16 corresponding to the specific hydraulic actuator among the plurality of operating means 18-21 has been operated to supply the hydraulic fluid to cylinder chamber 5*a* in the load-retaining side, with an intention to conduct the heavy load fine speed operation work. Additionally, the function that the controller 44 performs in step S120 of FIG. 9, and the solenoid valve 45 shown in FIG. 1 constitute bypass control means for actuating the center bypass cutoff valve 41 when the operation detection means detects that the operating means 16 corresponding to the specific hydraulic actuator 5 has been operated to supply the hydraulic fluid to the cylinder chamber 5*a* in the load-retaining side.

Moreover, the pressure sensor 42 constitutes first detection means for detecting an operation signal of the operating means 16 corresponding to the specific hydraulic actuator 5 generated when the operating means is operated to supply the hydraulic fluid to the cylinder chamber 5*a* in the load-retaining side. The function that the controller 44 performs in FIG. 9, and the solenoid valve 45 shown in FIG. 1 constitute bypass control means that calculates a rate ΔPpbu of change of the operation signal detected by the first detection means (pressure sensor 42), and determines, when the operation signal has a value larger than a first predetermined value Ppmin and the rate of change is smaller than a third predetermined value ΔPpbu0, that the operating means 16 corresponding to the specific hydraulic actuator 5 has been operated to supply the hydraulic fluid to the cylinder chamber 5*a* of the specific hydraulic actuator 5 in the load-retaining side, and actuates the center bypass cutoff valve 41.

The present embodiment having the above configuration/construction also yields substantially the same effects as in the first embodiment.

Furthermore in the present embodiment, if the change rate ΔPpbu of the boom-up operating pilot pressure Ppbu is smaller than the predetermined value ΔPpbu0 having association with the maximum operating speed that the boom control lever 16*a* is assumed to obtain during lifting, lifting is determined to have been started, so when the boom is raised to lift the material 131 from a state of being placed on the ground, the center bypass cutoff valve 41 is activated simultaneously with the start of lifting of the material 131. Thus, when the material 131 later leaves the ground and the bottom-side cylinder chamber 5*a* of the boom cylinder 5 generates a high retaining pressure to boost the boom bottom pressure, the fluid delivery pressure of the first hydraulic pump 2 immediately increases above the pressure (boom bottom pressure) of the bottom-side cylinder chamber 5*a* in the boom cylinder 5. This increase results in the delivered hydraulic fluid from the first hydraulic pump 2 being supplied to the bottom-side cylinder chamber 5*a* of the boom cylinder 5, enabling the boom to lift the material 131 smoothly from the ground level into the air.

Fourth Embodiment

A fourth embodiment of the present invention is described below referring to FIGS. 10 and 11. The present embodiment provides advantageous effects of the invention in not only applications that require moving a material upward by boom raising during lifting, but also those which require moving the material forward (away from vehicle body) by arm dumping, or arm pushing.

(Overall Configuration)

Figure 10:
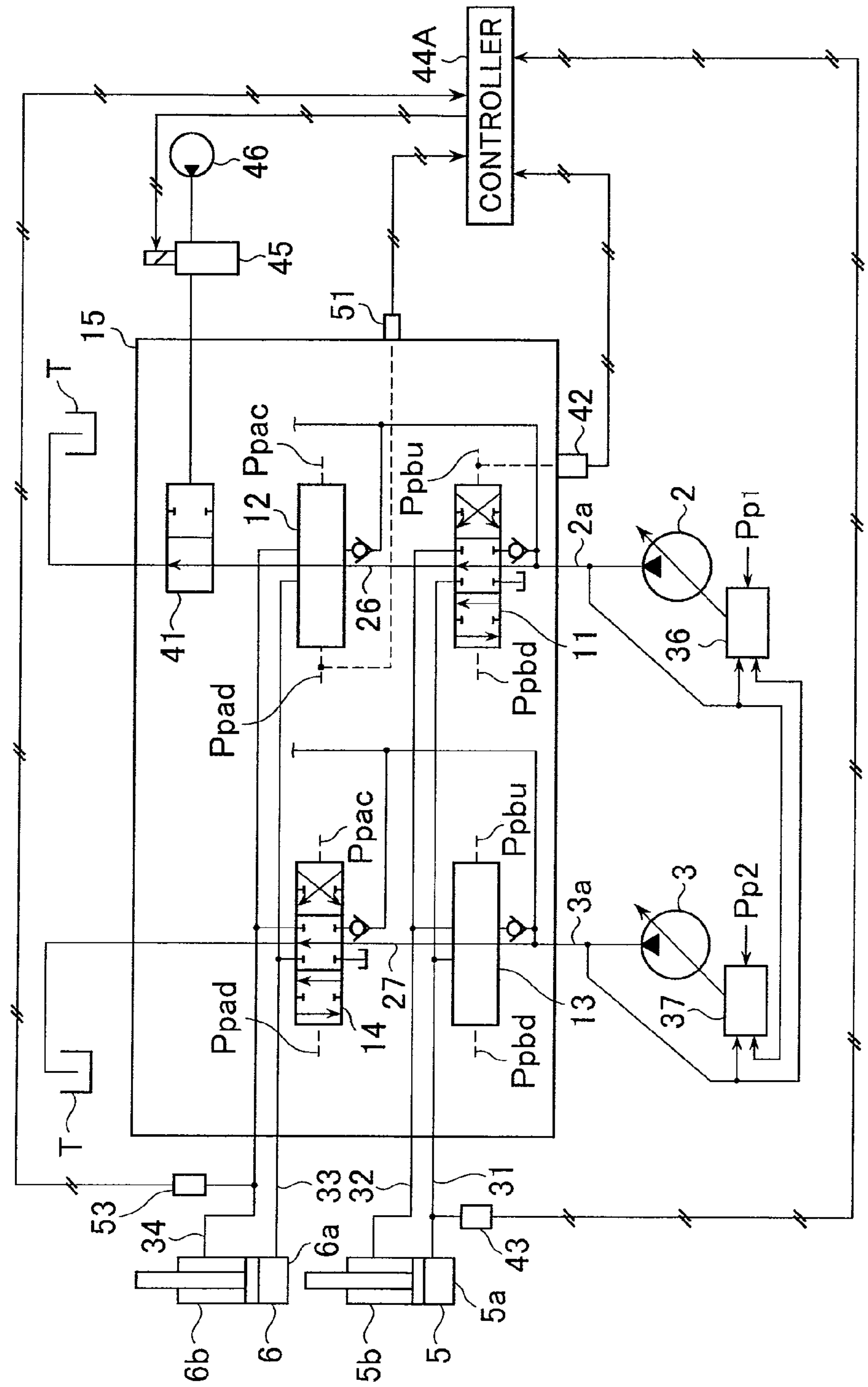
FIG. 10 is an overall configuration diagram of a hydraulic system according to a fourth embodiment of the present invention.

FIG. 10 is an overall configuration diagram of a hydraulic system according to the present embodiment. In addition to the constituent elements shown in FIG. 1 of the first embodiment, the hydraulic system according to the present embodiment includes, as feature constituent elements, a pressure sensor 51 that detects the operating pilot pressure Ppad defined by an arm-dumping (arm-pushing) command, and a pressure sensor 53 that detects a pressure (arm rod pressure)

Par defined by the rod-side cylinder chamber 6*b* of the arm cylinder 6. A controller 44A receives detection signals from the pressure sensors.

(Controller)

Figure 11:
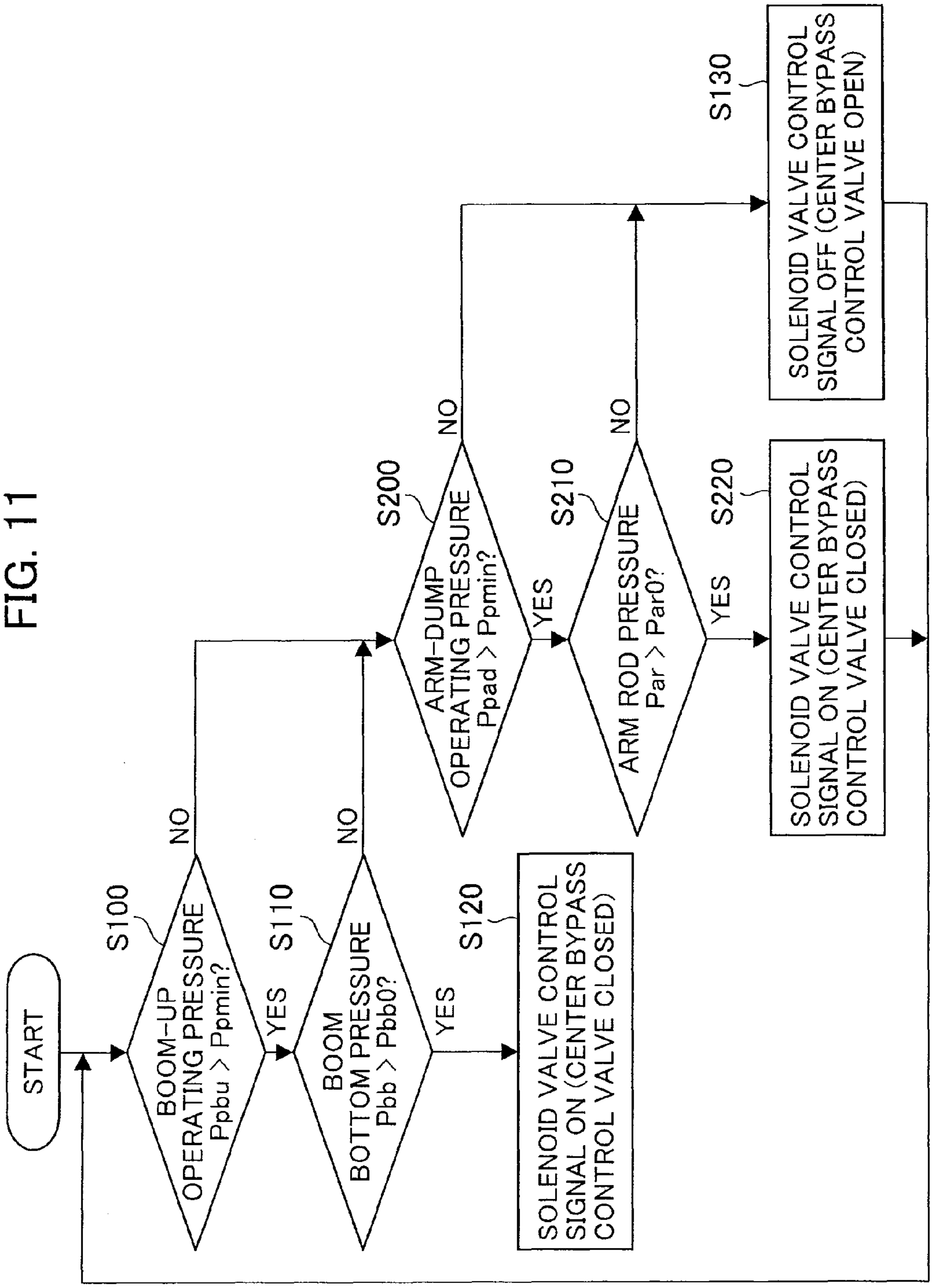
FIG. 11 is a flowchart that shows details of processing by a controller equipped in the hydraulic system according to the fourth embodiment of the present invention.

FIG. 11 is a flowchart that shows details of processing by the controller 44A.

The controller 44A conducts substantially the same kind of processing as in steps S100, S110, S120 of the first embodiment. That is to say, the controller 44A upon receiving the detection signals from the pressure sensors 42, 43 determines that if the boom-up operating pilot pressure Ppbu is greater than the predetermined value Ppmin and the boom bottom pressure is greater than the predetermined value Pbb0, lifting by boom raising has been started. The controller 44A also generates a control ON signal to energize the solenoid valve 45, and after providing this control ON signal with software-based filtering, outputs the filtered signal to the solenoid valve 45. This makes the solenoid valve 45 generate a control pressure equivalent to the control ON signal, and thus switch the center bypass cutoff valve 41 from the open position to the close position.

If the boom-up operating pilot pressure Ppbu is not greater than the predetermined value Ppmin or if the boom bottom pressure is not greater than the predetermined value Pbb0, the controller 44A receives a detection signal from the pressure sensor 51 and determines whether the operating pilot pressure Ppad, defined by the arm-dumping (arm-pushing) command, is greater than a predetermined value Ppmin (step S200). The predetermined value Ppmin, as with that of the first embodiment, is a minimal operating pilot pressure created when the control lever or operating pedal of the operating device (control lever device and operating pedal device). If the operating pilot pressure Ppad, defined by the arm-dumping (arm-pushing) command, is greater than the minimal operating pilot pressure Ppmin, this means that the control lever 17*a* of the control lever device 17 for the arm has been operated in the arm-dumping direction.

If the operating pilot pressure Ppad, defined by the arm-dumping (arm-pushing) command, is greater than the predetermined value Ppmin, the controller 44A further receives a detection signal from the pressure sensor 53 and determines whether the pressure (arm rod pressure) Par of the bottom-side cylinder chamber 6*a* of the arm cylinder 6 is greater than a predetermined value Par0 (step S210). The predetermined value Par0 is a minimal arm rod pressure (load-retaining pressure) suitably applied to the present invention during lifting. If the arm rod pressure is greater than the predetermined value Par0, this means that the present invention is suitably applied to lifting.

In the case where the arm rod pressure is greater than the predetermined value Par0, the controller outputs the control ON signal to the solenoid valve 45 (step S220), as in step S120, and then switches the center bypass cutoff valve 41 from the open position to the close position.

If the operating pilot pressure Ppad, defined by the arm-dumping (arm-pushing) command, is not greater than the predetermined value Ppmin or if the arm rod pressure is not greater than the predetermined value Par0, the controller leaves the control signal off for the solenoid valve 45 (step S130) and holds the center bypass cutoff valve 41 in its open position.

In the above, the boom cylinder 5 and the arm cylinder 6 include a specific hydraulic actuator that has a bottom-side cylinder chamber 5*a*, 6*a* and a rod-side cylinder chamber 5*b*, 6*b* and in which either one of the bottom-side cylinder chamber and the rod-side cylinder chamber becomes a load retaining side during heavy load fine speed operation work. In addition, the pressure sensors 42, 43, 51, 53, the controller 44A, and the solenoid valve 45 constitute control means for controlling the center bypass cutoff valve (41) such that when the operating means 16, 17 corresponding to the specific hydraulic actuator among the plurality of operating means 18-21 (FIG. 2) is operated to supply the hydraulic fluid to the cylinder chamber 5*a*, 6*b* of the specific hydraulic actuator 5, 6 in the load-retaining side, the center bypass cutoff valve 41 is actuated and a fluid delivery pressure of the first hydraulic pump 2 becomes higher than the load pressure of the specific hydraulic actuator 5, 6.

Furthermore, the pressure sensors 42, 43, 51, 53 and the functions that the controller 44A performs in steps S100, S110, S200, S210 of FIG. 11 constitute operation detection means for detecting whether the operating means 16, 17 corresponding to the specific hydraulic actuator 5, 6 among the plurality of operating means 18-21 has been operated to supply the hydraulic fluid to cylinder chamber 5*a*, 5*a*, or 6*a* in the load-retaining side, with an intention to conduct the heavy load fine speed operation work. Additionally, the functions that the controller 44 performs in steps S120, S220 of FIG. 11, and the solenoid valve 45 constitute bypass control means for actuating the center bypass cutoff valve 41 when the operation detection means detects that the operating means 16, 17 corresponding to the specific hydraulic actuator 5, 6 has been operated to supply the hydraulic fluid to the cylinder chamber 5*a*, 5*b* in the load-retaining side.

Moreover, the pressure sensors 42, 51 constitute first detection means for detecting an operation signal of the operating means 16, 17 corresponding to the specific hydraulic actuator 5, 6 generated when the operating means 16, 17 is operated to supply the hydraulic fluid to the cylinder chamber 5*a*, 6*b* in the load-retaining side. The pressure sensors 43, 53 constitute second detection means for detecting a pressure of the cylinder chamber 5*a*, 5*b* of the specific hydraulic actuator 5, 6 in the load-retaining side. The controller 44A and the solenoid valve 45 constitute bypass control means that determines, when the operation signal detected by the first detection means has a value larger than a first predetermined value Ppmin and the pressure detected by the second detection means is greater than a second predetermined value Pbb0, Par0, that the operating means 16, 17 corresponding to the specific hydraulic actuator 5, 6 has been operated to supply the hydraulic fluid to the cylinder chamber 5*a*, 5*b* of the specific hydraulic actuator 5, 6 in the load-retaining side, and actuates the center bypass cutoff valve 41.

The present embodiment having the above configuration/construction also yields substantially the same effects as in the first embodiment.

During lifting, when a material is moved forward by arm dumping (arm pushing), the present embodiment provides substantially the same effects as when the material is moved upward by boom raising.

More specifically, during materials lifting, movement in the fore and aft direction of the lifted material 131 (position adjustment) is accomplished by pushing/pulling (arm dumping/arm crowding) and swinging of the arm 112. In this case, arm dumping for pivotally moving the arm 112 (see FIG. 7) forward (away from the vehicle body) from a substantially upright posture causes the rod-side cylinder chamber 6*b* of the arm cylinder 6 to become a load retaining side and thus a high retaining pressure is generated in the rod-side cylinder chamber 6*b*.

An operator operates the control lever 17*a* of the arm control lever device 17 (see FIG. 2) in the arm-dumping direction with an intention to move the material 131 forward by arm dumping during lifting. The operating pilot pressure Ppad, defined by the arm-dumping command, is then generated and the flow/directional control valves 12, 14 are switched to the position corresponding to the arm-crowding direction (in the figure, rightward), as in the case that the control lever 16*a* of the boom control lever device 16 is operated. The first and second hydraulic pumps 2, 3 consequently increase in displacement volume according to particular magnitudes of the first and second pump control pressures Pp1, Pp2 (i.e., magnitude of the operating pilot pressure Ppbu defined by the boom-raising command), thereby increasing in fluid delivery flow rate.

In addition, the operating pilot pressure Ppad, defined by the arm-dumping command, is detected by the pressure sensor 51, and the detection signal from the pressure sensor 51 is input to the controller 44A along with the detection signal applied from the pressure sensor 53 detecting the pressure (arm rod pressure) of the bottom-side cylinder chamber 6*b* inside the arm cylinder 6. As a result, the determinations conducted in steps S200 and S210 are both affirmed as in the case that the control lever 16*a* of the boom control lever device 16 is operated. Next after output of the control ON signal to the solenoid valve 45 in step S220, the center bypass cutoff valve 41 is switched from the open position to the close position to cut off the center bypass line 26.

Hence, even if the operating quantity of the control lever 17*a* is small and the fluid delivery flow rates of the first and second hydraulic pumps 2, 3 are also small, the fluid delivery pressure of the first hydraulic pump 2 rapidly increases above the arm rod pressure Par and causes the delivered fluid from the first hydraulic pump 2 to be supplied to the rod-side cylinder chamber 6*b* of the arm cylinder 6, that is, to the cylinder chamber in a load retaining side. The arm cylinder 6 is consequently driven to contract for the arm to move away from the vehicle body by turning forward.

Under normal working conditions with low arm rod pressure Par, the determination in step S210 is negated, so that the center bypass cutoff valve 41 remains inactive and the arm cylinder 6 operates as usual.

As described above, in the present embodiment, when the material is moved forward (away from the vehicle body) by arm dumping (arm pushing) during lifting, the operation amount of the control lever 17*a* for the arm can also be minimized, thereby reducing energy loss to prevent deterioration of fuel consumption and obtaining the excellent fine speed operability.

Other Embodiments

Other embodiments may incorporate various changes and modifications falling within the spirit and range of the present invention. For example, while the above embodiments have each been described taking a hydraulic excavator as an example of the working machine, substantially the same advantageous effects can also be obtained by applying the invention to hydraulic cranes, wheeled excavators, and other working machines capable of conducting the material lifting that is the heavy load fine speed operation work. Additionally, while the configuration of the fourth embodiment has been based upon the first embodiment so as to activate the center bypass cutoff valve 41 even in the case of moving the material forward (away from the vehicle body) by arm dumping (arm pushing), the configuration of the fourth embodiment may be based upon the second or third embodiment so as to activate the center bypass cutoff valve 41 even in the case of moving the material forward (away from the vehicle body) by arm dumping (arm pushing). In this case, substantially the same advantageous effects as in the second or third embodiments as well as in the fourth embodiment can be obtained.

DESCRIPTION OF REFERENCE NUMBERS AND SYMBOLS

1 Engine (FIG. 6)
2 First hydraulic pump
3 Second hydraulic pump
4 Hydraulic actuator (Boom cylinder)
5*a* Bottom-side cylinder chamber
5*b* Rod-side cylinder chamber
6 Hydraulic actuator (Arm cylinder)
6*a* Bottom-side cylinder chamber
6*b* Rod-side cylinder chamber
7 Swing motor (FIG. 6)
8 Bucket cylinder (FIG. 6)
11 Flow/directional control valve for boom
12 Flow/directional control valve for arm
13 Flow/directional control valve for boom
14 Flow/directional control valve for arm
15 Control lever device for boom
16 Control lever device for arm
18-21 Other operating devices (Control lever devices and operating pedal devices)
23 Shuttle block
26, 27 Center bypass lines
36 First regulator
37 Second regulator
41 Center bypass cutoff valve
42 Pressure sensor
43 Pressure sensor
44 Controller
44A Controller (FIG. 9)
45 Solenoid valve
46 Pilot pump
51 Pressure sensor
53 Pressure sensor
100 Lower track structure
101 Upper swing structure
102 Front working implement
103*a*, 103*b* Crawler track devices
104*a*, 104*b* Traveling motors
106 Engine room
107 Cabin (Operator's compartment)
111 Boom
112 Arm
113 Bucket
130 Hook
131 Material
Rb Center bypass passage
Ri Meter-in passage
Ro Meter-out passage

The invention claimed is:

1. A working machine comprising:

a front working implement for material lifting; and a hydraulic system connected to the front working implement, wherein the hydraulic system includes:

a variable-capacity hydraulic pump;

a center bypass line connected to the hydraulic pump on an upstream side thereof and connected to a tank on a downstream side thereof;

a plurality of hydraulic actuators driven by a hydraulic fluid delivered from the hydraulic pump, where the hydraulic actuators include a specific hydraulic actuator that has a bottom-side cylinder chamber and a rod-side cylinder chamber and either one of the bottom-side cylinder chamber and the rod-side cylinder chamber becomes a load retaining side during heavy load fine speed operation work;

a plurality of actuator lines connected to the hydraulic actuators respectively;

a plurality of center bypass type, flow/directional control valves each including a center bypass passage and a meter-in passage, the center bypass passage being positioned on the center bypass line and the meter-in passage being positioned on a hydraulic line that communicates a hydraulic fluid supply line receiving the hydraulic fluid delivered from the hydraulic pump to the actuator lines, and each of the flow/directional control valves being configured such that with an increase in stroke thereof, an opening area of the center bypass passage is reduced while an opening area of the meter-in passage is increased to thereby control flows of the hydraulic fluid supplied from the hydraulic pump to the plurality of hydraulic actuators;

a plurality of operating devices provided for the plurality of hydraulic actuators to operate the respective flow/directional control valves; and a pump regulator to control a capacity of the hydraulic pump such that a delivery rate of the hydraulic fluid therefrom increases depending on operations of the operating devices;

a center bypass cutoff valve disposed at a position downstream of the flow/directional control valve corresponding to the specific hydraulic actuator on the center bypass line passing through the plurality of flow/directional control valves; and control means for controlling the center bypass cutoff valve such that when the one of the operating devices corresponding to the specific hydraulic actuator is operated to supply the hydraulic fluid to the load-retaining side of the specific hydraulic actuator, the center bypass cutoff valve is actuated and a fluid delivery pressure of the hydraulic pump becomes higher than a load pressure of the specific hydraulic actuator, wherein the control means includes:

operation detection means for detecting whether the one of the operating devices corresponding to the specific hydraulic actuator has been operated to supply the hydraulic fluid to the load-retaining side of the specific hydraulic actuator to conduct the heavy load fine speed operation work, and bypass control means for actuating the center bypass cutoff valve when the operation detection means detects that the one of the operating devices corresponding to the specific hydraulic actuator has been operated to supply the hydraulic fluid to the to the load-retaining side of the specific hydraulic actuator to conduct the heavy load fine speed operation work.

2. The working machine according to claim 1, wherein the control means further includes:

first detection means for detecting an operation signal of the one of the operating devices corresponding to the specific hydraulic actuator generated when the one of the operating devices is operated to supply the hydraulic fluid to the load-retaining side of the specific hydraulic actuator, and second detection means for detecting a pressure on the load-retaining side of the specific hydraulic actuator, and wherein the bypass control means determines, when the operation signal detected by the first detection means has a value larger than a first predetermined value for determining that the one of the operating devices corresponding to the specific hydraulic actuator has been operated and the pressure detected by the second detection means is greater than a second predetermined value for determining that the heavy load fine speed operation work is to be performed, that the heavy load fine speed operation work is initiated, and actuates the center bypass cutoff valve so the fluid delivery pressure of the hydraulic pump becomes higher than the load pressure of the specific hydraulic actuator.

3. The working machine according to claim 2, wherein:

the bypass control means calculates a target opening area of the center bypass cutoff valve, the target opening area becoming smaller as the pressure detected by the second detection means increases, and controls the center bypass cutoff valve so the opening area of the center bypass cutoff valve equals the target opening area.

4. The working machine according to claim 1, wherein the front working implement has a hook for the material lifting.

5. A hydraulic system in a working machine including a front working implement to perform material lifting, the hydraulic system comprising:

a variable-capacity hydraulic pump;

a center bypass line connected to the hydraulic pump on an upstream side thereof and connected to a tank on a downstream side thereof;

a plurality of hydraulic actuators driven by a hydraulic fluid delivered from the hydraulic pump, where the hydraulic actuators include a specific hydraulic actuator that has a bottom-side cylinder chamber and a rod-side cylinder chamber and either one of the bottom-side cylinder chamber and the rod-side cylinder chamber becomes a load retaining side during heavy load fine speed operation work;

a plurality of actuator lines connected to the hydraulic actuators respectively;

a plurality of center bypass type, flow/directional control valves each including a center bypass passage and a meter-in passage, the center bypass passage being positioned on the center bypass line and the meter-in passage being positioned on a hydraulic line that communicates a hydraulic fluid supply line receiving the hydraulic fluid delivered from the hydraulic pump to the actuator lines, and each of the flow/directional control valves being configured such that with an increase in stroke thereof, an opening area of the center bypass passage is reduced while an opening area of the meter-in passage is increased to thereby control flows of the hydraulic fluid supplied from the hydraulic pump to the plurality of hydraulic actuators;

a plurality of operating devices provided for the plurality of hydraulic actuators to operate the respective flow/directional control valves; and a pump regulator to control a capacity of the hydraulic pump such that a delivery rate of the hydraulic fluid therefrom increases depending on operations of the plurality of operating devices;

a center bypass cutoff valve disposed at a position downstream of the flow/directional control valve corresponding to the specific hydraulic actuator on the center bypass line passing through the plurality of flow/directional control valves; and control means for controlling the center bypass cutoff valve such that when one of the operating devices corresponding to the specific hydraulic actuator among is operated to supply the hydraulic fluid to the load-retaining side of the specific hydraulic actuator, the center bypass cutoff valve is actuated and a fluid delivery pressure of the hydraulic pump becomes higher than a load pressure of the specific hydraulic actuator, wherein the control means includes:

first detection means for detecting an operation signal of the one of the operating devices corresponding to the specific hydraulic actuator generated when the one of the operating devices is operated to supply the hydraulic fluid to the load-retaining side of the specific hydraulic actuator, and bypass control means that calculates a rate of change of the operation signal detected by the first detection means, and determines, when the operation signal has a value larger than a first predetermined value and the rate of change is smaller than a second predetermined value, that the one of the operating devices corresponding to the specific hydraulic actuator has been operated to supply the hydraulic fluid to the load-retaining side of the specific hydraulic actuator, and actuates the center bypass cutoff valve.

6. The working machine according to claim 5, wherein the front working implement has a hook for the material lifting.

* * * * *